US011430595B2

United States Patent
King et al.

(10) Patent No.: US 11,430,595 B2
(45) Date of Patent: Aug. 30, 2022

(54) ELECTRICAL TRANSFORMER TROUGH

(71) Applicants: Robert Greg King, Ardmore, OK (US); Joe Brent Loftis, Sulphur, OK (US)

(72) Inventors: Robert Greg King, Ardmore, OK (US); Joe Brent Loftis, Sulphur, OK (US)

( * ) Notice: Subject to any disclaimer, the term of this patent is extended or adjusted under 35 U.S.C. 154(b) by 542 days.

(21) Appl. No.: 16/602,158

(22) Filed: Aug. 17, 2019

(65) Prior Publication Data

US 2021/0050137 A1    Feb. 18, 2021

(51) Int. Cl.
*H02G 9/02* (2006.01)
*H01F 27/06* (2006.01)
*H02G 9/10* (2006.01)

(52) U.S. Cl.
CPC .............. *H01F 27/06* (2013.01); *H02G 9/10* (2013.01)

(58) Field of Classification Search
CPC .. H02G 9/10; H02G 9/00; H02G 9/02; H02G 9/06; H02G 9/065; H02G 3/00; H02G 3/04; H02G 3/0431; H02G 3/0437; H02G 3/0462; H02G 3/22; H02G 3/28; H02G 3/283; H02G 3/30; H02G 3/36; H02G 3/383; H01F 27/06; H01F 27/02
USPC .... 174/38, 19, 21 R, 68.1, 68.3, 72 R, 70 C, 174/96; 248/68.1, 49
See application file for complete search history.

(56) References Cited

U.S. PATENT DOCUMENTS

| | | | | |
|---|---|---|---|---|
| 4,165,592 | A | * | 8/1979 | Blankenship ............ H02G 9/10 174/38 |
| 4,213,111 | A | * | 7/1980 | Lux, Jr. .................... H01F 27/02 174/38 |
| RE31,134 | E | | 1/1983 | Lux |
| 5,111,000 | A | | 5/1992 | Maraldo |
| 5,220,484 | A | | 6/1993 | Seri |
| 5,587,554 | A | * | 12/1996 | Kendrick, Jr. ............ H02G 9/10 174/37 |
| 5,683,203 | A | | 11/1997 | Anderson |
| 5,883,207 | A | | 3/1999 | Youn et al. |
| 6,321,928 | B1 | * | 11/2001 | Goldenstein ............ E02D 27/42 220/484 |
| 9,508,481 | B1 | | 11/2016 | Reynolds |
| D813,183 | S | | 3/2018 | Guentert |

* cited by examiner

*Primary Examiner* — Angel R Estrada
(74) *Attorney, Agent, or Firm* — Randal Homburg

(57) ABSTRACT

An in-ground electrical transformer trough, supporting a transformer pad is a non-conductive composite vault located below a transformer pad to provide for better access to a molded cavity below the transformer and pad to prevent access by animals, to enhance wire mobility to make it easier to switch or terminate insider the transformer, with the new design of the new bell designed at the bottom of the trough preventing floating, lift or rise after installation and to allow additional pipes, conduits and wires to be installed in the future, wherein the trough is installed prior to the installation of the ground pad and transformer to be set stable within the soil, with the transformer pad poured around the rim of the trough, further preventing slant or misplacement of the transformer and pad and providing a more solid mounting upon the ground surface without future sinking, tilt or slant.

2 Claims, 4 Drawing Sheets

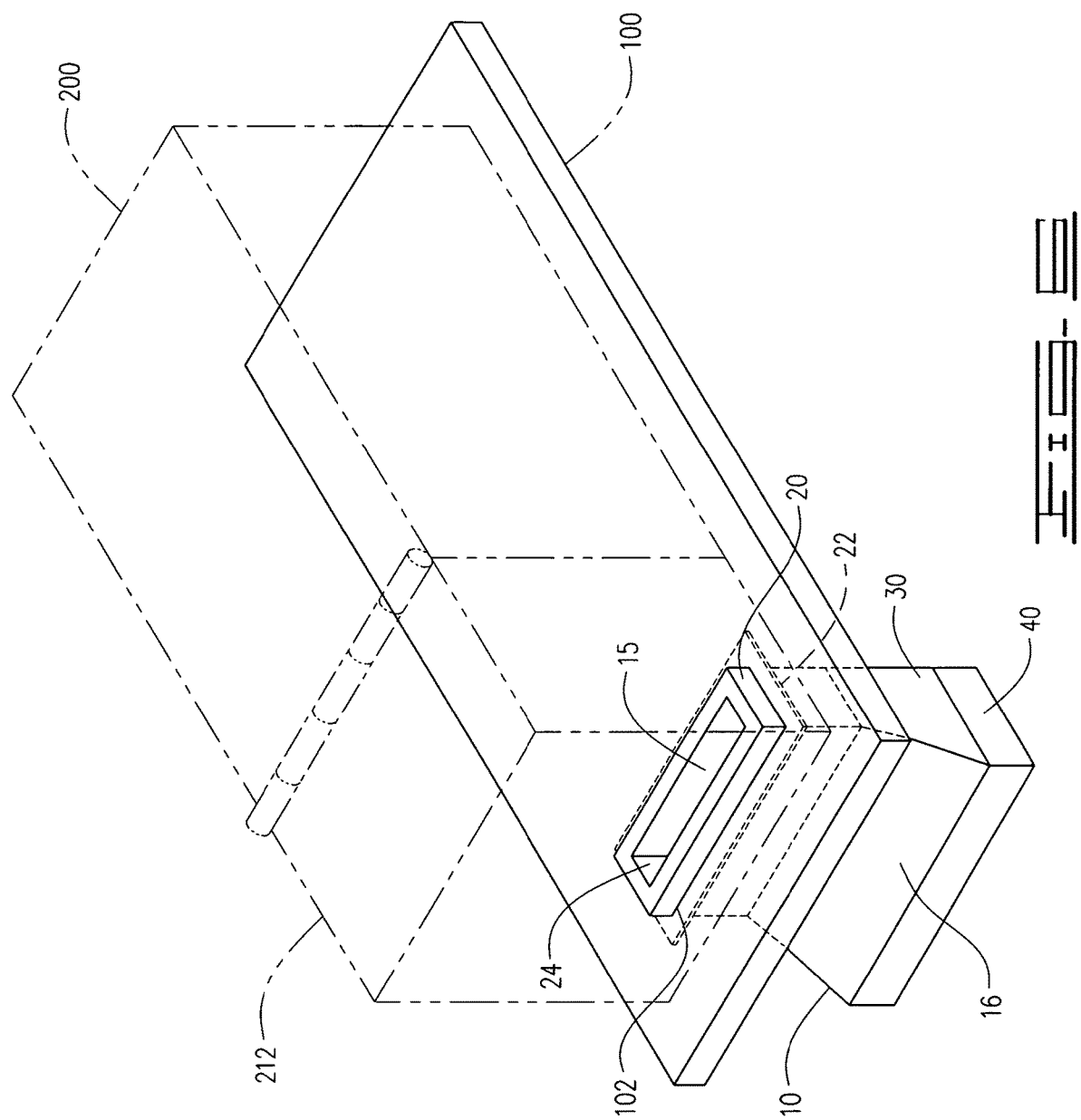

ELECTRICAL TRANSFORMER TROUGH

CROSS REFERENCE TO RELATED APPLICATIONS

None.

I. BACKGROUND OF THE INVENTION

1. Field of Invention

An in-ground electrical transformer trough, supporting a transformer pad is a non-conductive composite vault located below a transformer pad to provide for better access to a molded cavity below the transformer and pad to prevent access by animals, to enhance wire mobility to make it easier to switch or terminate insider the transformer, with the new design of the new bell designed at the bottom of the trough preventing floating, lift or rise after installation and to allow additional pipes, conduits and wires to be installed in the future, wherein the trough is installed prior to the installation of the ground pad and transformer to be set stable within the soil, with the transformer pad poured around the rim of the trough, further preventing slant or misplacement of the transformer and pad and providing a more solid mounting upon the ground surface without future sinking, tilt or slant.

2. Description of Prior Art

A preliminary review of prior art patents was conducted by the applicant which reveal prior art patents in a similar field or having similar use. However, the prior art inventions do not disclose the same or similar elements as the present in-ground transformer trough upon which is mounted a ground-surface transformer pad and ground transformer, nor do they present the material components in a manner contemplated or anticipated in the prior art.

In U.S. Pat. No. 5,111,000 to Maraldo, an enclosure is provided for a semi-buried electrical enclosure defining an underground vault suspending a transformer to allow easy access to the transformer below the transformer to connect electrical cables. The enclosure is integrated with the transformer, unlike the present ground trough which is integrated with a concrete pad poured on the ground surface upon which the transformer is positioned. An entire "cabin" enclosure placed within the ground contains a transformer and other high voltage electrical equipment with a ground mounted external unit with a fresh air line to provide fresh air inside the buried enclosure containing the high voltage electrical equipment, the "cabin" comprising an inner vault within an outer vault, as disclosed in U.S. Pat. No. 5,220,484 to Seri.

A support for a ground mounted transformer is disclosed in U.S. Pat. No. 5,833,207 to Hagenhoff. A transformer vault is part of the assembly disclosed in U.S. Patent RE 31,134, to Lux, Jr., which provides a transformer unit comprising a transformer, a ground level base pad having a vertical cable opening therethrough, and an open top, open bottom vertical cable vault situated in the earth, the upper end thereof being received in the pad opening to provide easy access to and training room for underground electrical cables connected to the transformer. The vault in Lux does not provide for a flared portion nor an flange engaging the upper chimney which is integrated with the concrete pad poured around and attaching to the concrete pad during the construction prior to the placement and attachment of the ground transformer. Without the flared portion and also the contrasting dimensions between the lower end and the upper chimney, contrary to the Lux, Jr. Vault, which has a common dimension between the upper end and lower end of Lux, the present trough could "float" or wash out of the ground and destabilize the integrated concrete pad. The contrast between the upper chimney and the lower end will inhibit, resist and prevent floating and destabilization of the concrete pad.

II. SUMMARY OF THE INVENTION

The primary objective of the invention is to provide a ground-stabilized electrical trough buried within the ground below the site of a concrete pad upon which a ground mounted electrical transformer is placed. In the prior art, concrete pads are commonly used to support ground mounted transformers. Over time, these concrete pads often suffer destabilization from water erosion or soil shifting from ground water, including "floating". These concrete pads are often quickly constructed and are generally 2-4 inches thick, and simply poured into a form that is temporarily placed on the ground prior to the placement of the transformer.

The present trough provides two purposes and improvements over prior art. First, the trough is dug into the ground at the location where the high voltage connector cable intended for connection to the ground transformer extend. The trough provides unobstructed access to the high voltage connector cables for connection to the transformer through the concrete pad, not unlike the vault identified in Lux. However, the present trough defines a contrast between an upper chimney with the upper opening, a lower end being larger in circumference than the upper chimney, and a tapered and flared portion, between the upper chimney and the lower end, extending forward and one each side when buried in the ground prior to the pouring of the pad. Further, an upper pad flange is slid over the upper chimney along the outer wall and connects the upper chimney and a lower surface of the concrete pad, being integrated into the concrete pad as the concrete cures. The transition of dimensions from the larger lower end and the upper chimney resist movement of the trough over time and prevents, avoids and resists movement of the trough and provides stabilization to the integrated concrete pad supporting the transformer.

III. DESCRIPTION OF THE DRAWINGS

The following drawings are submitted with this utility patent application.

FIG. 6 is an upper perspective view of the ground transformer trough installed and integrated with the concrete pad, with phantom lines indicating the ground mounted electrical transformer with a hinged cowling.

IV. DESCRIPTION OF THE PREFERRED EMBODIMENT

Figure 1:
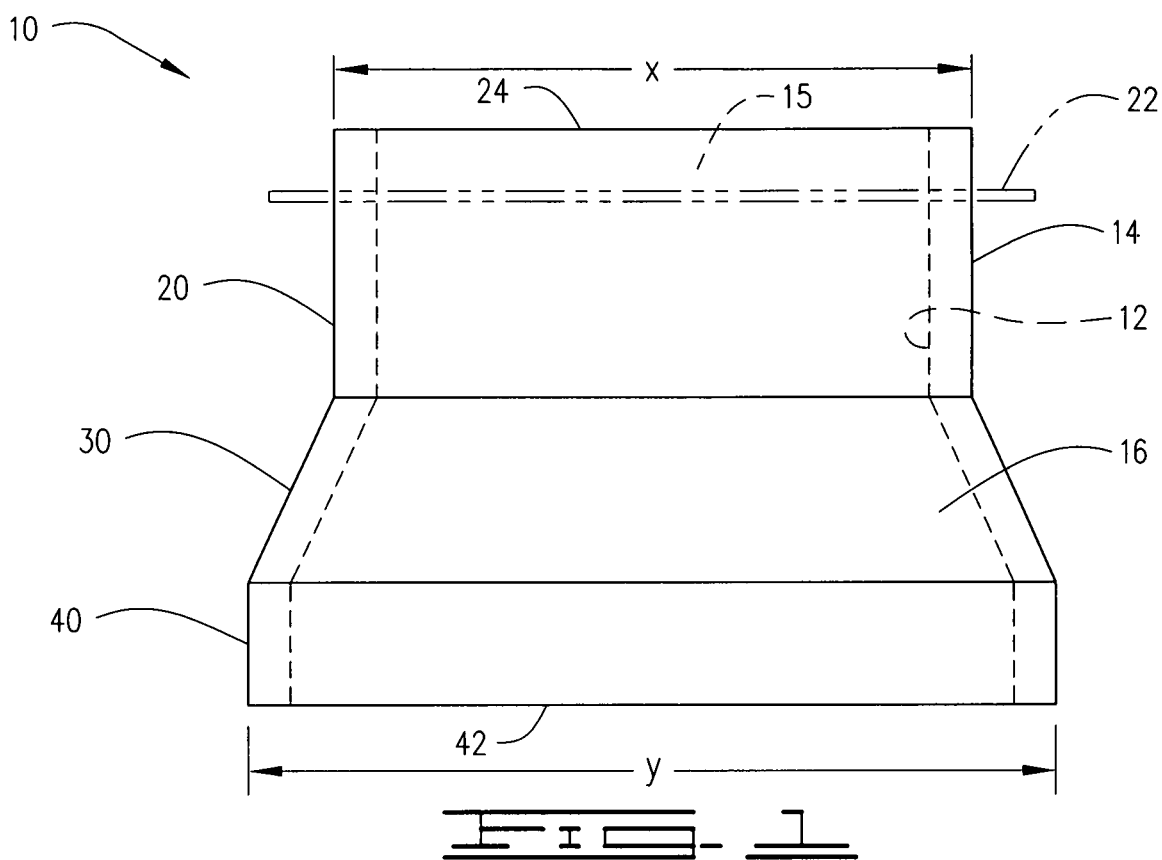
FIG. 1 is a front view of the ground transformer trough with phantom lines indicating the upper pad flange.

High voltage ground transformers are becoming more frequent in residential and commercial settings as high voltage cables are being relocated underground to reduce power outages caused by ice and wind damage to elevated power lines. In general, the transformer is installed after a flat concrete pad is poured on the ground's surface and the transformer is placed upon it, with the high voltage cables breaking through the ground surface to connect to the transformer. These cables are run either through the concrete pad or extend from the ground nearby. Depicted in the drawing figures is a concrete pad 100, the transformer 200 having a front panel 210 and a cowling 212 protecting the front panel 210 from access and those coming into contact with the transformer 200 from intrusion into the high voltage cable 220 connecting to the front panel 210.

Over time, the hastily poured concrete pads 100 have been known to shift, sink and tilt from water and soil destabilization, causing the transformer to shift, tilt or lean. When a heavy transformer 200 is not held flat, the components within the transformer 200, in many cases liquid chemicals, cause the transformer to operate inefficiently, which cause the transformer to overheat and over time, cease operation. The present trough 10 is an inexpensive device which stabilizes the concrete pad 100 when installed in the ground A at the time of the concrete pad installation and prior to the connection of the high voltage cable 220 to the transformer 200.

Figure 2:
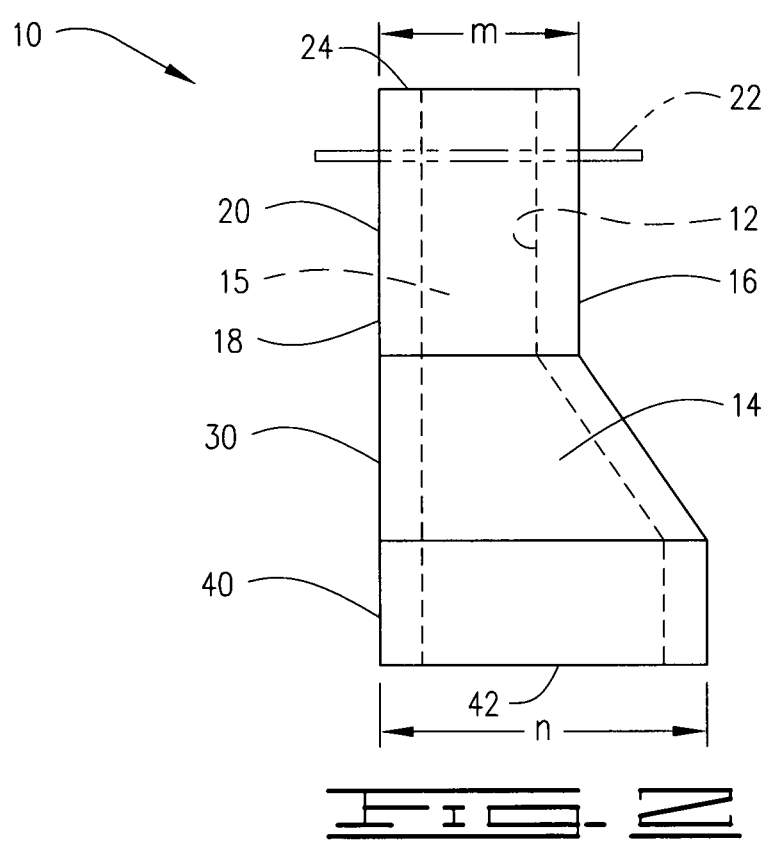
FIG. 2 is a side view of the ground transformer trough with phantom lines indicating the upper pad flange.
Figure 3:
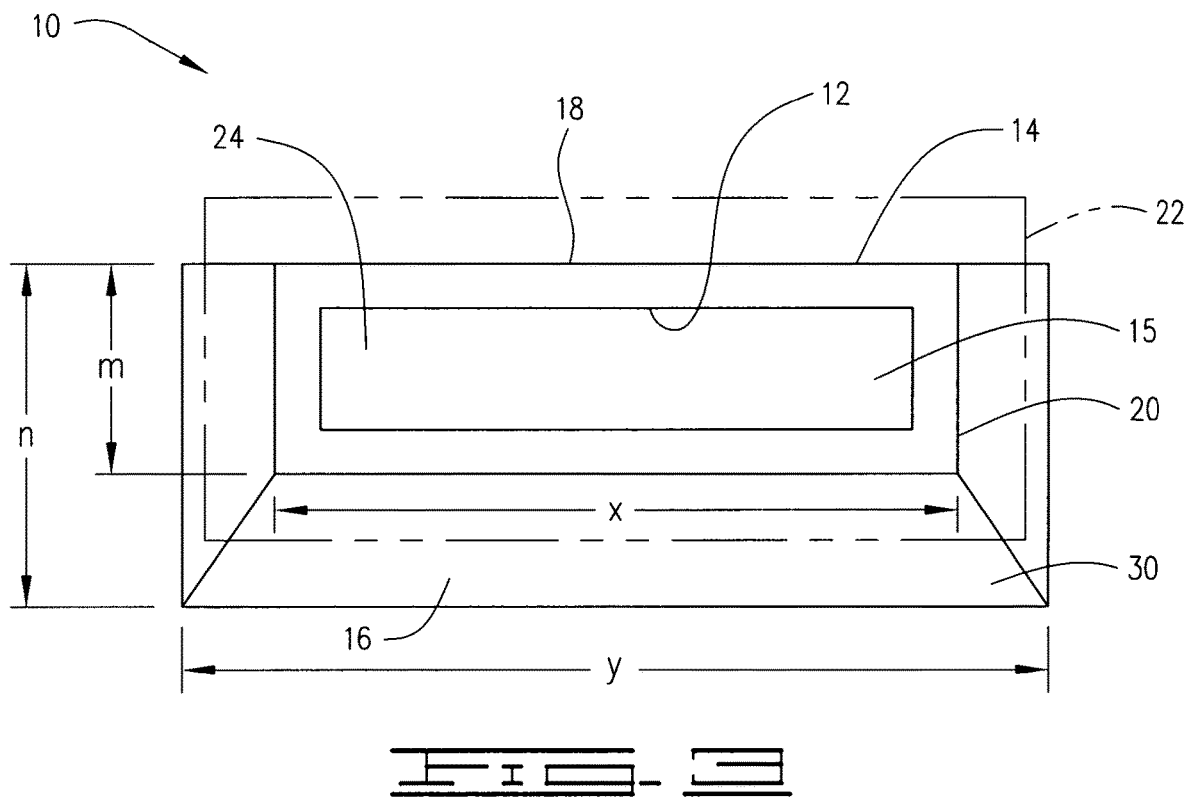
FIG. 3 is a top view of the ground transformer trough with phantom lines indicating the upper pad flange.
Figure 4:
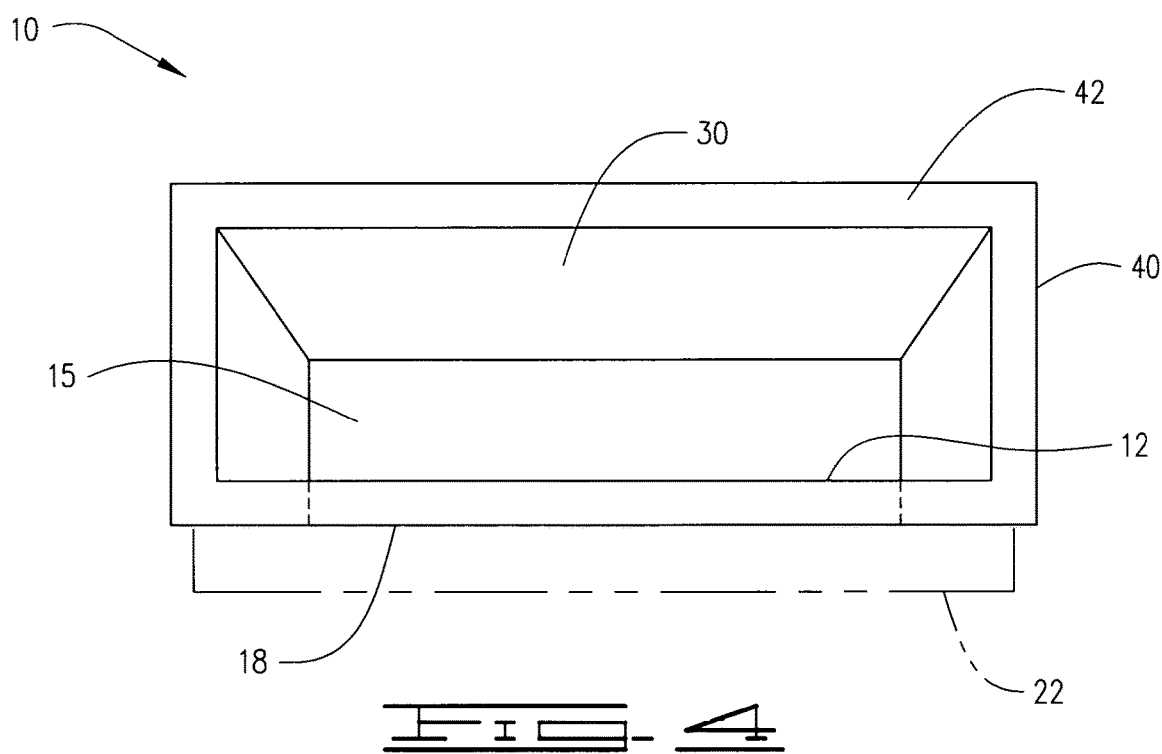
FIG. 4 is a bottom view of the ground transformer trough with phantom lines indicating the upper pad flange.

The ground transformer trough 10, FIGS. 1-4 is a hollow device which defines an inner wall 12, outer wall 14, a front wall 16 and a rear wall 18 further defining a trough channel 15 from an upper opening 24 to a lower opening 42. An upper chimney 20 defines the upper opening 24 and provides a width x from side to side, FIG. 1, and a depth m from the front wall 16 to the rear wall 18, FIG. 2. A lower end 40 defines the lower opening 42 and provides a width y from side to side greater than the width x of the upper chimney 20 and a depth n from front wall 16 to rear wall 18 greater than the depth m of the upper chimney 20, FIGS. 1 and 2. A flared portion 30 is located between the upper chimney 20 and the lower end 40, as shown in FIGS. 1 and 2 of the drawings, to complete the enclosure and continue the trough channel 15 from the upper opening 24 to the lower opening 42. It is made by casting of form shaping the trough into a unitized structure made from a non-conductive material which can be selected from a group of polymeric substances that form a hard and solid structure. The choice of polymeric substances include plastics, fiberglass, resin compositions, amalgams, concrete, gunnite, ceramics, nylon, acetate, high carbon plastics or other formable materials that create solid structures which are not affected by underground placement, weather or outside pressures and forces associated with in-ground structures.

Figure 5:
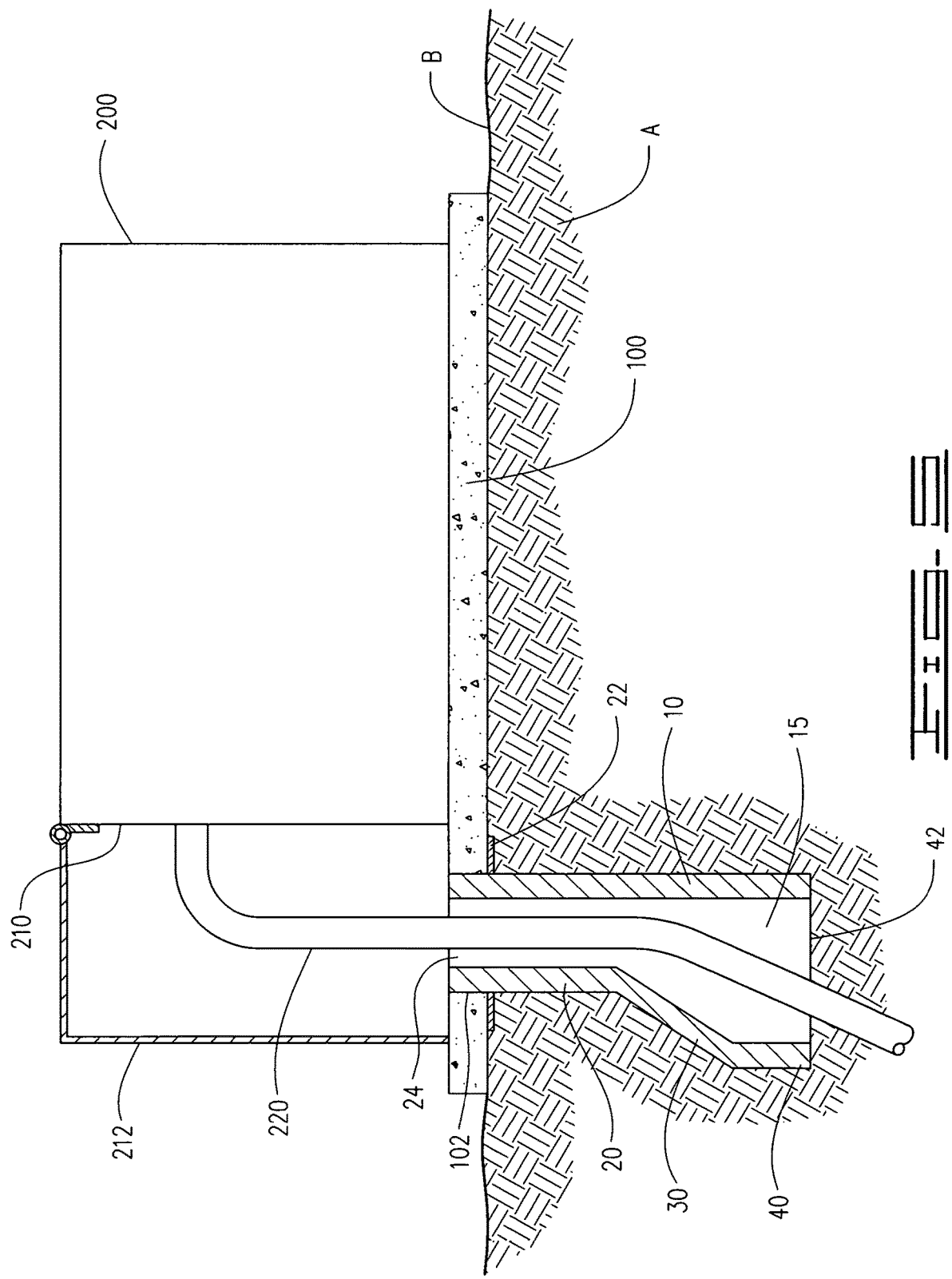
FIG. 5 is a side cross-sectional view of the ground transformer trough installed underground below a concrete pad which is supporting a ground mounted electrical transformer having a cowling covering a front electrical panel receiving buried high voltage electrical cables.

The trough 10 is located and installed in the ground A at the time the high voltage cable 220 is run and prior to the installation of the concrete pad 100, with the upper chimney 20 extending above a ground surface B and the upper opening 24 being level with the concrete pad 100 upon which the transformer 200 will be positioned. An upper pad flange 22 is fitted around the upper chimney 20 and is placed at a location against the concrete pad 100 and ground surface B location, as shown in FIGS. 5 and 6. As the concrete pad 100 is poured, the upper pad flange becomes integrated into the concrete pad 100, holding firm the position of the upper chimney 20 and fitting the concrete pad 100 onto the ground transformer trough 10, which is firmly buried in the ground A below the concrete pad 100. Because of the taper of the ground transformer trough 10 profile is narrower at the top than the bottom, the ground transformer trough 10 provides stabilization from all direction, front to back, side to side and upwards and downwards, maintaining stability and position of the concrete pad 100 and in turn, the ground transformer 200. This level and stable surface for the transformer 200 will extend the life of the transformer, improve its efficiency and performance, and will maintain a constant voltage output. The ground transformer trough 10 also provides for protection and reduction of strain on the high voltage cables and keeps rodents and animals away from the insulation on the high voltage cables. It also provides easier access for future cable runs through the concrete pad for buried residential lines coming off the transformer 200, not shown. While the ground transformer trough 10 has been particularly shown and described with reference to a preferred embodiment thereof, it will be understood by those skilled in the art that changes in form and detail may be made therein without departing from the spirit and scope of the invention.

What is claimed is:

1. A ground transformer trough for integration with a ground surface concrete pad used to support a high voltage transformer attached to high voltage underground cable, said transformer trough comprising:
   an inner wall, outer wall, front wall and a rear wall defining a trough channel having an upper opening and a lower opening;
   an upper chimney defining said upper opening and providing a width and a depth, said upper chimney integrated within said concrete pad with said upper opening extending through said concrete pad to provide access for said high voltage electrical cable to connect to said ground transformer placed upon said concrete pad;
   a lower end defines said lower opening providing a width greater than said width of said upper chimney and a depth greater than said depth of said upper chimney;
   a flared portion located between said upper chimney and said lower end to enclose said through channel from said upper opening to said lower opening; and
   an upper pad flange fitted around said upper chimney of said buried ground transformer trough, said upper pad flange placed at a location against said concrete pad and ground surface, wherein as said concrete pad is poured, said upper pad flange becomes integrated into said concrete pad, holding firm the position of said upper chimney and fitting said concrete pad onto said ground transformer trough firmly buried in the ground below said concrete pad to inhibit movement of the concrete pad and enhance stability of said concrete pad and said transformer mounted upon said concrete pad.

2. The ground transformer trough of claim 1 wherein said trough is made by casting or form shaping said trough into a unitized structure made from a non-conductive material, selected from a group of materials selected from a group of polymeric substances forming hard and solid structures, said group of materials including polymeric plastics, fiberglass, resin compositions, amalgams, concrete, gunnite, ceramics, nylon, acetate, high carbon plastics or other formable materials which create solid structures which are not affected by underground placement, weather or outside pressures and forces associated with in-ground structures.

* * * * *